United States Patent
Pribonic et al.

(10) Patent No.: US 6,533,083 B1
(45) Date of Patent: Mar. 18, 2003

(54) EDDY CURRENT BRAKING APPARATUS

(75) Inventors: Edward M. Pribonic, Seal Beach, CA (US); Marc T. Thompson, Watertown, MA (US)

(73) Assignee: Magnetar Technologies, Inc, Seal Beach, CA (US)

( * ) Notice: Subject to any disclaimer, the term of this patent is extended or adjusted under 35 U.S.C. 154(b) by 0 days.

(21) Appl. No.: 09/504,575

(22) Filed: Feb. 15, 2000

(51) Int. Cl.[7] .................................................. B60L 7/00
(52) U.S. Cl. ...................................................... 188/165
(58) Field of Search ................................. 188/165, 164, 188/158, 159, 161; 104/281, 283, 284; 105/73, 77

(56) References Cited

U.S. PATENT DOCUMENTS

| | | | | |
|---|---|---|---|---|
| 3,723,795 A | * | 3/1973 | Baermann ..................... 310/93 |
| 3,806,782 A | * | 4/1974 | Matsui et al. ................ 318/135 |
| 3,828,686 A | * | 8/1974 | Steenbeck et al. ... 104/148 MS |
| 3,840,096 A | * | 10/1974 | Tolksdorf .................... 188/165 |
| 4,217,829 A | * | 8/1980 | Heidelberg ................. 104/281 |
| 4,449,615 A | | 5/1984 | Beath et al. ................... 188/67 |
| 4,482,034 A | | 11/1984 | Baermann ................... 188/165 |
| 4,516,505 A | * | 5/1985 | Heidelberg ................. 104/284 |
| 4,676,173 A | | 6/1987 | Mielcarek et al. .......... 105/209 |
| 4,690,066 A | * | 9/1987 | Morishita et al. ........... 104/282 |
| 5,023,499 A | | 6/1991 | Kuwahara ................... 310/105 |
| 5,127,599 A | * | 7/1992 | Veraart ....................... 104/292 |
| 5,277,125 A | * | 1/1994 | DiFonso et al. ............ 104/292 |
| 5,402,021 A | * | 3/1995 | Johnson ........................ 310/12 |
| 5,518,087 A | | 5/1996 | Hwang et al. .............. 187/374 |
| 5,628,385 A | * | 5/1997 | Yumura et al. ............. 187/373 |
| 5,628,690 A | | 5/1997 | Spieldiener et al. ........ 472/131 |
| 5,722,326 A | * | 3/1998 | Post ............................ 104/281 |
| 5,749,534 A | | 5/1998 | Morimoto .................... 242/288 |
| 5,778,797 A | * | 7/1998 | Mutaguchi et al. ......... 105/148 |
| 5,791,442 A | * | 8/1998 | Arnold ........................ 188/138 |
| 5,804,897 A | | 9/1998 | Kuwahara ..................... 310/77 |
| 5,862,891 A | | 1/1999 | Kröger et al. .............. 188/165 |
| 5,868,076 A | * | 2/1999 | Myus et al. ................... 104/60 |
| 5,944,149 A | | 8/1999 | Kuwahara ................... 188/156 |
| 6,062,350 A | * | 5/2000 | Spieldiener et al. ........ 188/161 |
| 6,101,952 A | * | 8/2000 | Thornton et al. ........... 104/282 |
| 6,104,108 A | * | 8/2000 | Hazelton et al. .............. 310/12 |
| 6,293,376 B1 | * | 9/2001 | Pribonic ..................... 188/165 |

FOREIGN PATENT DOCUMENTS

WO  WO 9632172  10/1996

OTHER PUBLICATIONS

J. D. Edwards, B. V. Jayawant, W. R. C. Dawson and D. T. Wright, "Permanent–magnet linear eddy–current brake with a non–magnetic reaction plate.", IEE Proc.–Electr. Power Appl., vol. 146, No. 6, Nov. 1999, pp. 627–631.*

* cited by examiner

Primary Examiner—Christopher P. Schwartz
Assistant Examiner—Xuan Lan Nguyen
(74) Attorney, Agent, or Firm—Walter A. Hackler

(57) ABSTRACT

Eddy current braking Apparatus is provided which includes a single array of permanent magnet for providing a magnet flux. A electrically conducted member for exclusively engaging the magnetic flux provided by the single array of permanent magnet. The magnets and conductive member are mounted for enabling relative motion between the magnet array and the conductive member to produce any currents in the conductive member resulting in the braking force between magnets and the conductive member. The configuration of the magnets and the conductive member enable the braking system to be installed over curvilinear paths.

18 Claims, 2 Drawing Sheets

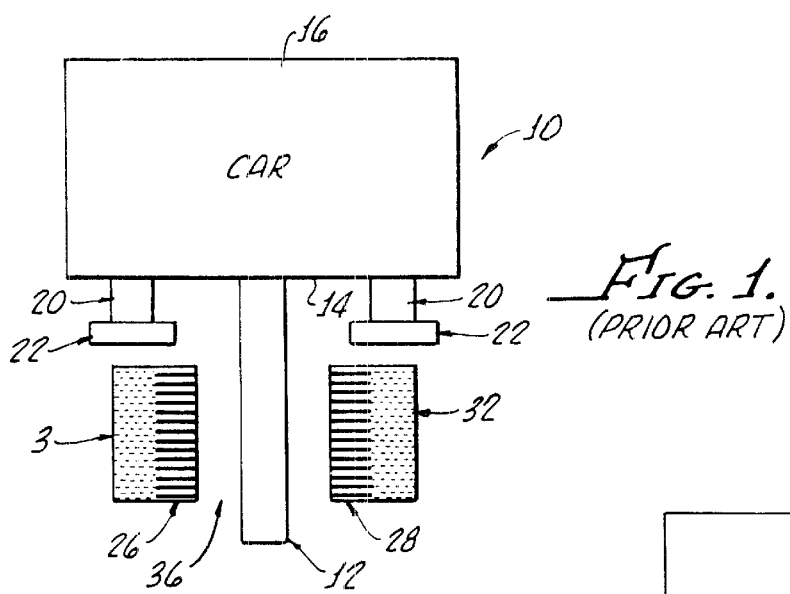
_Fig. 1._
(PRIOR ART)
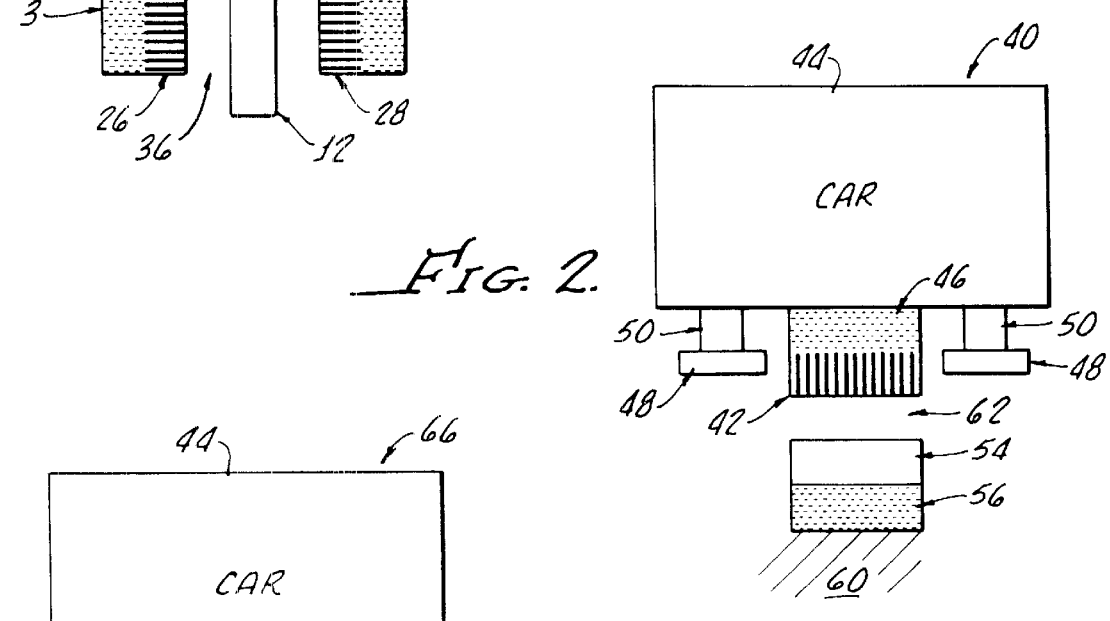
_Fig. 2._
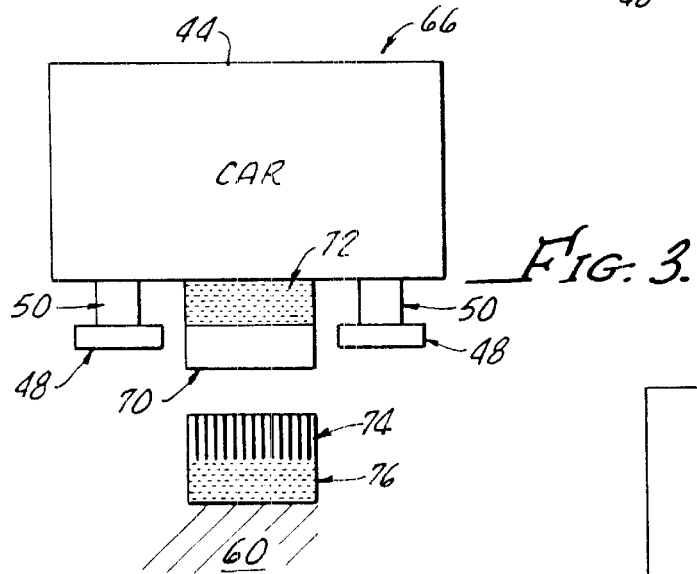
_Fig. 3._
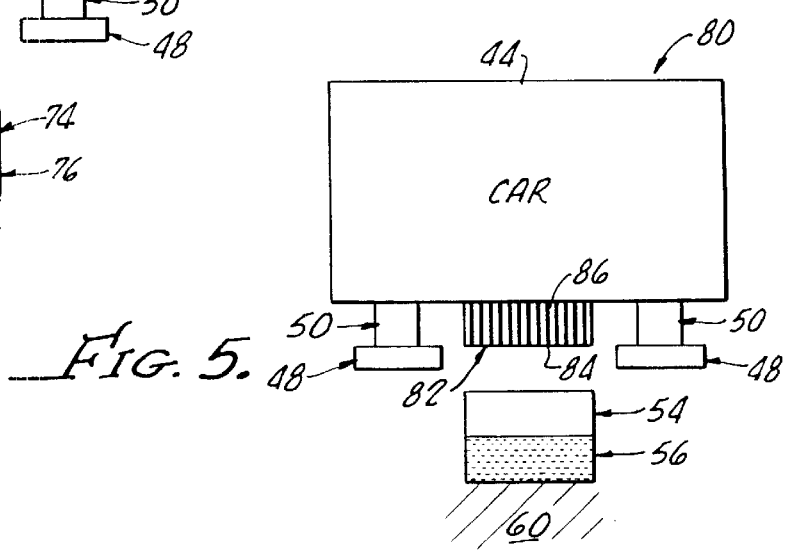
_Fig. 5._

EDDY CURRENT BRAKING APPARATUS

The present invention is generally related to permanent magnet linear brakes and is more particularly directed to eddy brake systems for movable cars, for example, rail supported cars, go-carts, elevator cars, conveyor cars, and roller coaster cars, among others.

As a specific example, the majority of hereinbefore constructed entertainment rides, such as roller coasters, have relied on friction brakes for deceleration and stopping of wheel-mounted cars. However, due to friction, such brakes are subject to wear and must be regularly monitored and serviced to maintain proper operating conditions.

Linear eddy current brakes would be a preferable replacement for such friction brakes inasmuch as no contact is made with the rail for braking and consequently, they are free from wear due to friction. Eddy current brakes are based on the law of induction. When a conductive member is moved through a magnetic field, eddy currents are generated in the member and a secondary magnetic field caused by the eddy currents is opposed to the magnetic field through which the member passes. The resulting force component acts opposite to the traveling direction of the member.

Electromagnetic coils may be utilized to generate the magnetic field for inducing eddy currents in the moving member, however, such electromagnetic systems require elaborate controllers in order to excite the coils at a proper time to effect the braking. Accordingly, it is more preferable to effect eddy current braking through the use of permanent magnets.

Hereinbefore, permanent magnetic linear eddy current brake systems have utilized two arrays of magnets attached to stationary rails with a conducting fin disposed on a moving object and arranged to pass through a gap provided between the two arrays of magnets. As the fin is passed through the magnet arrays, an electric eddy current is induced therein which reverses as the fin passes from a magnet of one polarity to a magnet of opposite polarity. As hereinabove noted, a force is then created and exerted on the fin which causes a braking force. Other prior art devices include Free Fall Towers which utilize two arrays of magnets on a car which travels along a stationary fin.

The hereinbefore linear braking systems have utilized two arrays of permanent magnets spaced apart from one another to establish a channel or gap there between the passage of a fin. This structural limitation limits such braking systems to applications on linear, or straight rail sections. Accordingly, there is a need for an eddy current braking systems which can be utilized on curvilinear rail sections and further, it is desirable to utilize a single array of permanent magnets in an eddy current braking system in order to reduce the cost thereof.

SUMMARY OF THE INVENTION

Eddy current braking apparatus, in accordance with the present invention, generally includes a single array of permanent magnets which provides a magnetic flux and a electrically conductive means for exclusively engaging the magnetic flux provided by the single array of permanent magnets.

Means are provided, mounting the magnets and the conductive means, for enabling relative motion, between the magnets and the conductive means, to produce eddy currents in the conductive means which result in a braking force between the magnets and the conductive means.

More particularly, the present invention may include a car with the magnets disposed on the car and the conductive means being stationary. In this instance, the conductive means is not limited to a linear configuration but may, in fact, be disposed in a curvilinear relationship. The car in this instance is guided along the appropriate curvilinear path.

Alternatively, the present invention may provide for the conductive means to be disposed in the car and the array of permanent magnets in a stationary position. In this instance, the array of permanent magnets may be disposed in a curvilinear arrangement with an appropriate guiding of the car along the curvilinear path.

Ferromagnetic backing means may be provided which support the conductive means and also provide a holding force between the magnetic means and the conductive means. When employed on the guided car, the ferromagnetic backing means enables a positive holding without relative motion between the magnets and the conductive means.

In another embodiment of the present invention, eddy current braking apparatus for a guided car is provided which includes first magnet means for providing a magnet flux with the first magnet means consisting of a first single array of permanent magnets. A first, electrically-conductive means is provided for exclusively engaging in magnetic flux provided by the first array of permanent magnets.

First means, mounting the first magnetic means and the first conductive means is provided for enabling relative motion between the first magnetic means and the first conductive means in order to produce eddy currents in the first conductive means resulting in a braking force between the first magnet means and the second conductive means.

Further second magnetic means are provided for producing a magnetic flux with the second magnet means consisting of a second single array of permanent magnets. A corresponding second, electrically conductive means is provided for exclusively engaging the second magnetic flux provided by the second single array permanent magnets.

Second means, mounting second magnet means and the second conductive means, is provided for enabling relative motion between the second magnet means and the second conductive means in order to produce eddy currents in the second conductive means resulting in a breaking force between the second magnet means and the second conductive means.

In one embodiment, the first and second magnet means may be disposed on opposite sides of the car and in another embodiment, the first and second conducted means are mounted on opposite sides of the guided car.

In yet another embodiment of the present invention, the permanent magnet array which has an orientation which significantly increases the flux density through one side, or pole face, of the permanent magnet array.

BRIEF DESCRIPTION OF THE DRAWINGS

The advantages and features of the present invention will be better understood by the following description when considered in conjunction with the accompanied drawings in which:

FIG. 1 is a representation of the prior art illustrating a car with a depending fin passing through a car between two stationary arrays of permanent magnets; p FIG. 2 is a representation of one embodiment of the present invention generally showing a single array of permanent magnets attached to a car and disposed for movement past a stationary electrically conductive member;

FIG. 3 is a representation of another embodiment of the present invention similar to that shown in FIG. 2 in which the single array of permanent magnets is stationary and the electrically conductive member is attached to a car;

FIG. 5 is yet another embodiment of the present invention similar to FIGS. 2 and 3 and utilizing a Halbach permanent magnet arrangement;

DETAILED DESCRIPTION

Figure 4:
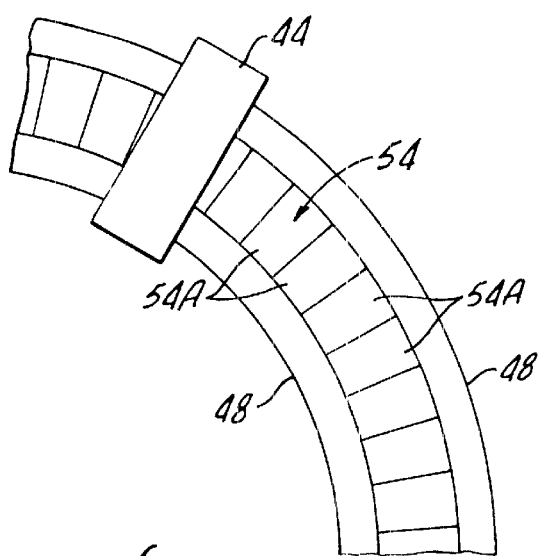
FIG. 4 is a plan view representation of the embodiment shown in FIGS. 2 or 3, illustrating a curvilinear pattern of permanent magnets or conductive members.

With reference to FIG. 1, there is shown a representation 10 of prior art linear eddy current braking system which includes a conductive member, or fin, 12 fixed to an underside 14 of the car between wheels 20 which are supported by rails 22.

The prior system 10 is configured and arranged for causing the fin 12 to pass between two arrays 26, 28 of permanent magnets which abut a ferromagnetic back iron 30, 32 as is well known in the art. The magnet arrays 26, 28 and back irons 30, 32 are stationary and affixed to structure not shown in FIG. 1. Magnetic flux maintained in a gap 36 between the two magnet arrays 26, 28, is intercepted by the electrically conductive fin 12 for producing eddy currents therein and a braking force as is well known in the art.

Numerous variables affect the braking force in eddy current or electrodynaric braking as is well known in the art. These variables include:

| | |
|---|---|
| B, magnetic flux density | B, magnetic flux density a higher flux density results in a higher braking force with the braking force scaling as B3. The flux density at the conducting member depends on permanent magnet strength, integrity of the magnetic circuit and airgap length |
| A, total magnet area | Braking force is proportional to $B^3A_r$. Hence a higher area of permanent magnets material results in proportionally higher braking force. |
| g, airgap | Airgap affects magnitude of the flux density. In general, operation at a smaller airgap g results in a higher mnagnetic flux density B and hence a higher braking force. |
| v, relative velocity between permanent magnets and fin | For a given magnet arrangement and conducting fin thickness there is an optimum velocity which maximizes the magnetic braking force. |
| T, conducting fin thickness | The conducting fin thickness T, magnetic pole spacing p, and electrical, σ of the fin also affecting the braking force. It is a multi-dimensional optimization problem to determine an optimal thickness, pole spacing and electrical conductivity. |
| P, pole pitch (distance between adjacent N and N poles in a magnet array) | |
| σ electrical conductivity of conductin fin | |

Limitations of the prior art devices, such as that shown in FIG. 1 which utilize two arrays of stationary permanent magnets and a movable fin, include cost because of the number of magnets necessary and further the structural limitations such as precise alignment of the arrays 26, 28 to form the narrow gap 36 through which the fin 12 must pass. It should be apparent that this prior art configuration would not be suitable for implementation along a curvilinear track, not shown in FIG. 1, supporting the car wheels 20.

The present invention is represented by the embodiment 40 shown in FIG. 2, includes a single array 42 of permanent magnets fixed to a car 44 with a back iron 46 disposed therebetween. Similar to the prior art 10, the car 40 may be supported by rails 48 and movable therealong by wheels 50. It should be appreciated that while a rail guided car is shown in the Figures, the present invention is not limited thereto but is applicable to non-guided objects as well.

The single array 42 of permanent magnets is a means for providing a magnetic flux. A, electrically conductive member 54 provides a means for exclusively engaging the magnetic flux provided by the single permanent magnet array 42. To enhance its effectiveness, the member 54 may be supported by the back iron 56 which is ferromagnetic and affixed to stationary supporting structure or ground 60.

The rails 48, wheels 50, and the ground, in combination, provide a means, mounting the magnet array 42 and conductive member 54, for enabling relative motion between the magnet array 42 and the conductive member 54 to produce eddy currents in the conductive member 54 which results in a braking force between the magnet array 42 and the conductive member 54.

The size and number of the magnets in the array 42 as well as the size and configuration of the conductive member 54 and the back irons 46 56 and a gap 62 that between are configured for providing the required braking force and calculated in accordance with the variables heretofore set forth.

Turning now to FIG. 3, there is shown another embodiment 66 of the present invention with common reference numerals representing identical or substantially the same components as those shown in FIG. 2. In this embodiment 66, a conductive member 70 is coupled to the car 44, through a back iron 72 and an array 74 of permanent magnets is attached to the supporting structure 60 through a back iron 76. Principal operation of the embodiment 66 is identical to that of the embodiment 40 shown in FIG. 2.

Importantly, the embodiments 40, 66 in accordance with the present invention enable braking of the car 44 over curvilinear sections of track 48 as represented in FIG. 4. While the curvilinear relationship in the Figure is shown in two dimensions, three dimensional curvilinear rail or track may also be used in accordance with the present invention. Thus, curvilinear in the context of the present invention means curvature in two or three dimensions. The conductive member 54 is comprised of a plurality of segments 54A centered between the curvilinear rails 48. It should be appreciated that while FIG. 4 shows the embodiment shown in FIG. 2 with the conductive members 54 being stationary in this configuration is also obtainable with the embodiment 66 in which the permanent magnets 74 are stationary and disposed between the rails 48.

Yet another embodiment 80 of the present invention is represented in FIG. 5 with common character references representing identical or substantially the same components as the embodiment 40 shown in FIG. 2. In the embodiment 80, a Halbach array 82 of permanent magnets is utilized. This arrangement of permanent magnets provides a greater flux on one side 84 of the array 82, than another side 86 which eliminates the necessity for any back iron such as with the standard array shown in FIG. 2. This permanent magnet array is well known, see "Design of Permanent Multiple Magnets with oriented rare earth cobalt material"K. Halbach; Nuclear Instruments & Methods, Vol. 169, 180 pp. 110.

It should also be appreciated that the ferromagnetic backing 56, 72 of the embodiments 40, 66 and 80, because of the magnetic coupling to the magnet array 42, 74, respectively, provides a means creating a holding force between the magnets 42, 84, the attached car and the back iron 56.

Thus, after a moving car is stopped by the braking system, it can be held in place in a stopped position. This feature is not feasible with the prior art system shown in FIG. 1.

Figure 6:
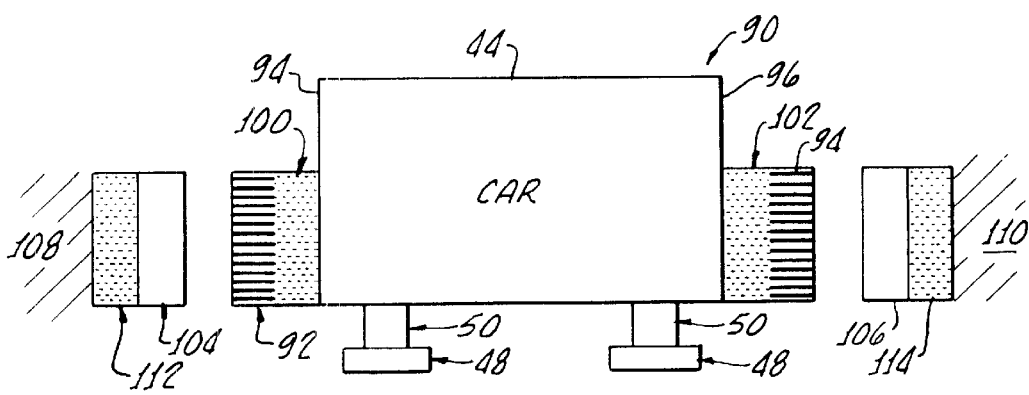
FIG. 6 is a representation of yet another embodiment of the present invention utilizing two arrays of permanent magnets each attached to opposite sides of a car, along with associated stationary electrically-conductive members.

Turning now to FIG. 6, there is shown another embodiment 90 in the present invention with character references shown in FIG. 6, representing identical or substantially similar components herein before discussed. The embodiment 90 includes two arrays 92 94 of permanent magnets disposed on opposite sides 94, 46 of the car 44 and coupled thereto through back irons 100, 102.

Conductive members 104, 106 are affixed in the structure 108, 110 through back irons 112, 114. The principle of operation in the sizing of the magnets 92, 94 conductive members 104, 106 and back irons 112, 114 are in accordance with the principles herein above set forth.

Figure 7:
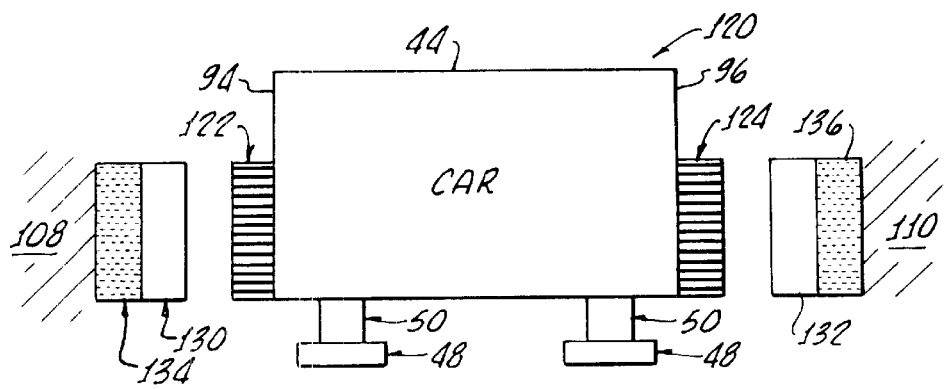
FIG. 7 is a representation of yet another embodiment of the present invention similar to that shown in FIG. 6 with the two arrays of permanent magnets being attached directly to the car without the use of back iron which is achieved through a specific arrangement of the permanent magnets known as a Halbach arrangement.

Yet another embodiment 120 is shown in FIG. 7 with identical character references representing identical or substantially similar components as herein before discussed. The embodiment 120 utilized Halbach permanent magnet arrangements 122, 124 attached to the opposite sides 94, 96 of the car 44, which eliminates the need for back iron. This aspect of the embodiment 120, is substantially the same as that described in FIG. 5, embodiment 80.

Conductive members 130, 132 attached through back irons 134, 136 to support the structure 108, 110 as hereinabove described.

Figure 8:
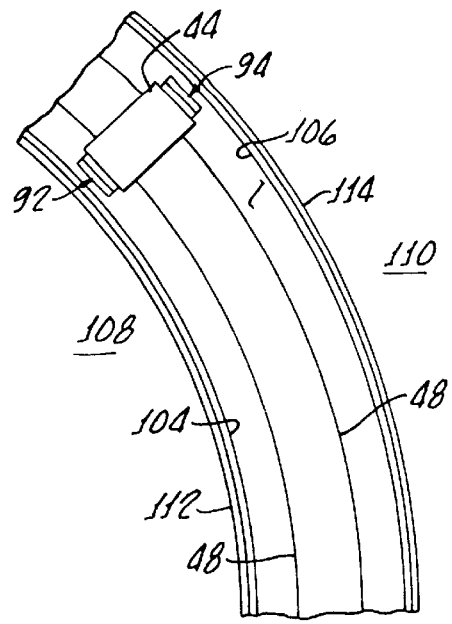
FIG. 8 is a plan view representation similar to that shown in FIG. 4, illustrating a curvilinear arrangement enabled by the configuration of new embodiment shown in FIGS. 6 and 7.

The embodiment shown in FIG. 7 also enables the use of curvilinear rails 48 as represented in FIG. 8 with identical character references representing identical or substantially similar components as shown in FIG. 6.

Although there has been hereinabove described Eddy current braking Apparatus in accordance with the present invention for the purpose of illustrating the manner in which the invention may be used to advantage, it will be appreciated that the invention is not limited thereto. Accordingly, all modifications, variation or equivalent arrangements which may occur those skilled in the art should be considered to be within the scope of the invention as defined in the appended claims.

What is claimed is:

1. Eddy current braking apparatus for a rail mounted car, the apparatus comprising:

magnets means for providing a magnetic flux, said magnet means consisting of a single array of permanent magnets;

electrically conductive means for exclusively engaging the magnet flux provided by the single array of permanent magnets;

means, mounting the magnet means and conductive means, for the enabling relative motion between the magnet means and conductive means to produce eddy currents in the conductive means resulting in a braking force between the magnet means and the conductive means;

ferromagnetic backing means, supporting the conductive means, for providing a holding force between the car and the conductive means.

2. Eddy current braking apparatus for a rail mounted car, the apparatus comprising:

a car movable along at least one rail;

magnet means, disposed on the car, for providing a magnetic flux, said magnet means consisting of a single array of permanent magnets;

conductive means disposed in a curvilinear pattern exterior to the car, for engaging the magnetic flux and causing movement of the car along the rail to produce eddy currents in the conductive means resulting in a braking force between the magnet means and the conductive means; and ferromagnetic backing means, supporting the conductive means, for providing a holding force between the car and the conductive means.

3. The apparatus according to claim 2 wherein the conductive means is disposed proximate the rail.

4. Eddy current braking apparatus for a rail mounted car, the apparatus comprising:

a car movable along at least one rail;

magnet means, disposed in a curvilinear pattern exterior to the car, for providing a magnetic flux, said magnet means consisting of a single array of permanent magnets;

conductive means, disposed on the car, for engaging the magnetic flux and causing movement of the car along the rail to produce eddy currents in the conductive means resulting in a braking force between the magnet means and the conductive means; and ferromagnetic backing means, supporting the conductive means, for providing a holding force between the car and the conductive means.

5. The apparatus according to claim 4 wherein the array of permanent magnet is disposed proximate the rail.

6. Eddy current braking apparatus for a rail mounted car, the apparatus comprising:

a plurality of braking systems, each system comprising:

magnet means for providing a magnetic flux, said magnetic means consisting of a single array of permanent magnets;

electrically conductive means for exclusively engaging the magnet flux provided by the single array of permanent magnets;

means, mounting the magnet means and conductive means for enabling relative motion between the magnet means and conductive means to produce eddy currents in the conductive means resulting in a braking force between the magnet means and the conductive means; and ferromagnetic backing means, supporting the conductive means, for providing a holding force between the car and the conductive means.

7. Eddy current braking apparatus for a rail mounted car, the apparatus comprising:

first magnet means for providing a magnetic flux, said first magnet means consisting of a first single array of permanent magnets;

to first electrically conductive means for exclusively engaging the magnet flux provided by the first single array of permanent magnets;

first means, mounting the first magnet means and first conductive means for enabling relative motion between the first magnet means and first conductive means resulting in a braking force between the first magnet means and the second conductive means;

second magnet means for providing a magnetic flux, said second magnet means consisting of a second single array of permanent magnets;

second electrically conductive means for exclusively engaging the second magnet flux provided by the second single array or permanent magnets;

second means, mounting the second magnet means and second conductive means for enabling relative motion between the second magnet means and second conductive means to produce eddy currents in the second conductive means resulting in a braking force between the recent magnet means and the second conductive means; and first ferromagnetic backing means, supporting the first conductive means, for providing a holding force between the first magnet means and the first conductive means; and second ferromagnetic backing means, supporting the second conductive means, for providing a holding force between the second magnet means and the second conductive means.

8. The apparatus according to claim 7 wherein the first and second magnet means are disposed on the rail-mounted car and the first and second conductive means are stationary.

9. The apparatus according to claim 8 wherein the first and second magnet means are disposed on opposite sides of the car.

10. The apparatus according to claim 8 wherein the first and second conductive means are curvilinear.

11. The apparatus according to claim 7 wherein the first and second conductive means are disposed on the rail mounted car and the first and second arrays of permanent magnets are stationery.

12. The apparatus according to claim 11 wherein the first and second conductive means are disposed on opposite sides of the car.

13. The apparatus according to claim 11 wherein the first and second arrays of permanent magnets are curvilinear.

14. Eddy current braking apparatus for a rail mounted car, the apparatus comprising:

magnet means for providing a magnetic flux, said magnet means consisting of a single array of permanent magnets arranged to provide greater flux on one side of the array than another side of the array;

electrically conductive means for exclusively engaging the magnetic flux provided by the single array of permanent magnets;

means, mounting the magnet means and conductive means for enabling relative motion between the magnet means and conductive means the conductive means passing through the greater flux on the one side of the array to enable eddy currents to be induced in the conductive means resulting in a braking force between the magnet means and the conductive means; and ferromagnetic backing means, supporting the conductive means, for providing a holding force between the car and the conductive means.

15. The apparatus according to claim 14 further comprising a car with the magnet means being disposed on the car and the conductive means being stationery.

16. The apparatus according to claim 15 wherein the conductive means is curvilinear.

17. The apparatus according to claim 14 further compromising a car with the conductive means being disposed on the car and the array of permanent magnets being stationery.

18. The apparatus according to claim 17 wherein the array of permanent magnets is curvilinear.

* * * * *

UNITED STATES PATENT AND TRADEMARK OFFICE
CERTIFICATE OF CORRECTION

| | |
|---|---|
| PATENT NO. | : 6,533,083 B1 |
| APPLICATION NO. | : 09/504575 |
| DATED | : March 18, 2003 |
| INVENTOR(S) | : Edward M. Pribonic and Marc T. Thompson |

It is certified that error appears in the above-identified patent and that said Letters Patent is hereby corrected as shown below:

On the Title Page, Item [57]

In the Abstract, line 3, "A electrically conducted" should be changed to --An electrically conductive--.

In the Abstract, line 5, "permanent magnet" should be changed to --permanent magnets--.

In the Abstract, line 7, "produce any" should be changed to --produce Eddy--.

In the Drawings

Figure 1, the numeral "3" should be changed to --30--.

In the Specification

Column 1, line 45, "between the" should be changed to --between for the--.

Column 1, line 57, "and a" should be changed to --and an--.

Column 2, line 30, "second conductive" should be changed to --first conductive--.

Column 2, line 60, "car between" should be changed to --gap between--.

Column 3, line 43, "electrodynaric" should be changed to --electrodynamic--.

Column 5, line 30, "46 of" should be changed to --96 of--.

Signed and Sealed this
Twenty-ninth Day of September, 2015

Michelle K. Lee
*Director of the United States Patent and Trademark Office*

CERTIFICATE OF CORRECTION (continued)
U.S. Pat. No. 6,533,083 B1

In the Claims

Column 7, line 12, in claim 7, "second donductive" should be changed to --first conductive--.

Column 7, line 18, in claim 7, "or permanent" should be changed to --"of permanent--.

Column 7, line 24, in claim 7, "recent magnet" should be changed to --"second magnet--.